US 8,266,098 B2

(12) United States Patent
Hu et al.

(10) Patent No.: US 8,266,098 B2
(45) Date of Patent: Sep. 11, 2012

(54) RANKING EXPERT RESPONSES AND FINDING EXPERTS BASED ON RANK

(75) Inventors: Jianying Hu, Yorktown Heights, NY (US); Jennifer Lai, Yorktown Heights, NY (US); Aleksandra Mojsilovic, Yorktown Heights, NY (US); Vikas Sindhwani, Yorktown Heights, NY (US); Kevin Singley, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 12/621,285

(22) Filed: Nov. 18, 2009

(65) Prior Publication Data

US 2011/0119264 A1 May 19, 2011

(51) Int. Cl.
*G06F 17/30* (2006.01)
(52) U.S. Cl. ........................................ 707/607
(58) Field of Classification Search .............. 707/2, 728, 707/607; 715/758
See application file for complete search history.

(56) References Cited

U.S. PATENT DOCUMENTS

| 7,177,316 | B1 | 2/2007 | Pilecek |
| 2003/0140037 | A1 | 7/2003 | Deh-Lee |
| 2007/0005698 | A1 | 1/2007 | Kumar et al. |
| 2007/0260587 | A1 | 11/2007 | Mohan |
| 2007/0294350 | A1 | 12/2007 | Kumar et al. |
| 2010/0036784 | A1* | 2/2010 | Mishne et al. ............ 706/45 |
| 2010/0250605 | A1* | 9/2010 | Pamu et al. ............ 707/783 |

OTHER PUBLICATIONS

"Taxonomy", Wikipedia, http://en.wikipedia.org/wiki/Taxonomy, last modified Oct. 11, 2009.
"Support vector machine", Wikipedia, http://en.wikipedia.org/wiki/Support_vector_machine, last modified Oct. 2, 2009.
"Predictive analytics", Wikipedia, http://en.wikipedia.org/wiki/Predictive_analytics, last modified Oct. 5, 2009.
"Power law", Wikipedia, http://en.wikipedia.org/wiki/Power_law, last modified Oct. 15, 2009.
"Lucene", Wikipedia, http://en.wikipedia.org/wiki/Lucene, last modified Oct. 8, 2009.
"Confusion matrix", Wikipedia, http://en.wikipedia.org/wiki/Confusion_matrix, last modified Oct. 19, 2009.
"tf-idf", Wikipedia, http://en.wikipedia.org/wiki/Tf%E2%80%93idf, last modified Sep. 9, 2009.
"Linear classifer", Wikipedia, http://en.wikipedia.org/wiki/Linear_classifier, last modified Nov. 6, 2009.

(Continued)

*Primary Examiner* — Etienne Leroux
(74) *Attorney, Agent, or Firm* — Scully, Scott, Murphy & Presser, P.C.; Daniel P. Morris, Esq.

(57) ABSTRACT

In a computerized social network, expert and user chat sessions are stored and rated probabilistically. Later user requests for information are met with an expert ranking, based on a balance of similarities between expert profile and questions; similarity between expert profile and prior chat sessions, and dynamically updated chat session ratings. New sessions can be rated automatically with reference to keywords distilled from past sessions responsive to user ratings—and based on session length.

17 Claims, 15 Drawing Sheets

OTHER PUBLICATIONS

"Binary classification", Wikipedia, http://en.wikipedia.org/wiki/Binary_classification, last modified Oct. 12, 2009.

"Bag of Words model", Wikipedia, http://en.wikipedia.org/wiki/Bag_of_words_model, last modified Jun. 11, 2009.

"Apache Lucene", http://lucene.apache.org/java/docs/, The Apache Software Foundation, 2006.

"Google accounts, Accounts Help" http://www.google.com/support/accounts/?hl=en, Google, 2009.

Zhang et al., "Expertise Networks in Online Communities: Structure and Algorithms", International World Wide Web Conference Committee (IW3C2), WWW 2007, May 8-12, 2007, Banff, Alberta, Canada, ACM 978-1-59593-654-7/07/0005.

* cited by examiner

| USER \ EXPERT | -   | 1  | 2  | 3  | 4  | 5  |
|---|---|---|---|---|---|---|
| -   | 526 | 13 | 11 | 25 | 15 | 29 |
| 1   | 81  | 1  | 5  | 4  | 3  | 5  |
| 2   | 48  | 0  | 2  | 4  | 3  | 1  |
| 3   | 87  | 5  | 4  | 9  | 3  | 13 |
| 4   | 85  | 2  | 4  | 9  | 8  | 15 |
| 5   | 95  | 2  | 5  | 22 | 10 | 27 |

FIG. 1

SAP ENROLLMENT AND BLUEREACH TAXONOMY

ABAP ALEEDI,65
ABAP ENHANCEMENT,69
ABAP GENERAL,116
ABAP INTERFACE,79
ABAP LSMW,48
ABAP MP,55
ABAP OOPS,42
ABAP SAPSCRIPT,61
ABAP SMARTFORM,27
ABAP SMARTFORMS,28
ABAP WORKFLOW,30
BASIS,78
BI,55
CRMS CRM,28
CRMS CS,13
CRMS SD,52
FMSS ASSETS,11
FMSS CONTROLLING,17
FMSS FINANCE,20
FMSS SEM,13
FMSS TREASURY,2
HCMS APPRAISALS,11
HCMS ECM,9
HCMS ESS,17
HCMS GENERAL,31
HCMS MSS,15
HCMS OM,31
HCMS OSA,2
HCMS PA,33
HCMS PAYROLL,12
HCMS PD,18
HCMS RECRUITMENT,14
HCMS TM,16
IS OIL,11
IS UTILITY,6
NETWEAVER CAF,10
NETWEAVER XMII,2
PM,26
PORTALS GENERAL,41
PORTALS JWD,22
SCMS APO,12
SCMS MM,29
SCMS PLANTM,8
SCMS PLM,5
SCMS PP,13
SCMS PS,9
SCMS QM,7
SCMS SRM,10
SCMS WM,9
SM,35
UPGRADE,47
XI,45

FIG. 4A

CHAT SESSIONS

EXPERT, Hi xxx.
USER, I want help on Vendor manged Inventory.
EXPERT, sure
USER, Any available User training manual or IMG available with you
EXPERT, user training manual is not there with me
USER, what type of help can be extended to me
EXPERT, if any question you have regarding vendor inventory
EXPERT, u can put it fwd
EXPERT, some problem u r facing while mapping any process
USER, no I am not able to start. I need VMI for specific Material...
USER, Never mind
EXPERT, do u have time...
USER, Any clue if any project has done VMI
USER, ya sure
EXPERT, i will get back to you through email by eod
EXPERT. i m really sorry
USER, that will be gr8
USER, thanks a ton UserRating = 4, ExpertRating = 1

FIG. 8A

CHAT SESSIONS

USER, hai
USER, I am xxx from SMB
EXPERT, hi
USER, do you have any expertise in catt
EXPERT, no
USER, ok thanks
USER, take care bye
EXPERT, np
EXPERT, bye UserRating = 1, ExpertRating = 4
RATINGS CAN BE SPARSE AND NOISY

FIG. 8B sim(profile(e), q)

FIG. 10A-1 sim(session(e,u,i),q)

FIG. 10A-2

$$score[query, doc] = \Sigma \; tf[termindoc] * idf[term]$$

WHERE

- *SCORE* IS A FUNCTION YIELDING A SCORE TO TEXT BASED ON A QUERY AND THE TEXT;
- *tf* IS A FUNCTION RETURNING THE FREQUENCY OF A TERM REPRESENTED BY THE VARIABLE "termindoc";
- *idf* IS A FUNCTION RETURNING THE INVERSE DOCUMENT FREQUENCY OF A TERM REPRESENTED BY THE VARIABLE "term",

FIG. 10B $$\text{Score}(e) = \alpha * \text{sim}(\text{profile}(e),q) + (1-\alpha) \sum_{u,i} \text{sim}(\text{session}(e,u,i),q) * [p(e,u,i) - 0.5]$$

WHERE:

- *e* IS VARIABLE REPRESENTING AN EXPERT;
- *q* IS A VARIABLE REPRESENTING A QUESTION;
- *profile(e)* IS A FUNCTION THAT RETRIEVES A PROFILE OF AN EXPERT;
- *sim()* IS A FUNCTION THAT CALCULATES SIMILARITY OF TEXT;
- *u* IS A VARIABLE REPRESENTING A PAST USER, WHO ENGAGED IN A CHAT SESSION;
- *i* IS AN INDEX RUNNING THROUGH THE STORED SESSIONS;
- *p()* IS A PROBABILISTIC SCORE ASSIGNED BY A RATINGS MODEL.

FIG. 10C

Accuracy(k)=[$\Sigma_{(i\ in\ pos)}$ p(i) + $\Sigma_{(i\ in\ neg)}$ (1-p(i))]/T   where p(i) = min(k/size(t(i)),1)

WHERE:

- *pos* AND *neg* REFER TO POSITIVE AND NEGATIVE SESSIONS RESPECTIVELY
- t(i) IS THE TOPIC ASSOCIATED WITH THE $i^{th}$ TEST SESSION, AND
- T IS TOAL TEST SIZE (44).

FIG. 10D score(e) = $\Sigma$ (p(e,u,i)-0.5)/n

FIG. 10E

RANKING EXPERT RESPONSES AND FINDING EXPERTS BASED ON RANK

BACKGROUND

The invention relates to the field of computerized social networking, and in particular to the problems of processing chat sessions and locating Subject Matter Experts (SMEs) within social networks.

Examples of expertise networks are known on the consumer web, and include message boards and online discussion forums focused on specialized topics. As members of online communities formed by these networks, participants can freely post questions as information seekers (users) and respond to questions as information providers (experts). Such knowledge sharing creates content on specialized topics that web search engines can then index to support similar information needs in the future which are otherwise hard to satisfy.

When social networks are used in a professional environment, one issue that presents itself is improving finding experts to enhance business operations. This issue arises more within larger organizations than smaller ones—and even more where organizations have multiple sites, especially where the sites are in more than one country. As organizations become increasingly global and telecommunications based, the geographical location of individual employees becomes less consequential in the daily conduct of business operations. By tapping into a global view of how people are connected in an organization, tools based on social network analysis can enhance long-range information-flow and knowledge sharing within the enterprise, beyond what can be offered by local access to other employees and traditional information sources such as intranet web pages.

A number of techniques have been proposed for finding experts in social networks. Generally, techniques for finding experts in social networks have involved matching a question with expert profiles, sometimes taking into account expert availability.

One example is to be found in J. Zhang et al., "Expertise Networks in Online Communities: Structure and Algorithms," International World Wide Web Conferences Committee (IW3C2), (May 8-12, 207, Banff, ALberta, Canada; ACM 978-1-59593-65-7/07/0005 ("Zhang et al."). Zhang et al. concluded that methods like page-rank that work for ranking web-pages, do not work very well for ranking experts due to structural differences in the web graph and the online user-expert network respectively. They simulated the dynamics of question-answering and found that expertise-networks are quite different structurally because users and experts do not behave in an identical manner.

SUMMARY

It would be desirable to evaluate chat sessions in order to provide information from those sessions to inform future sessions, for instance to improve matches between users seeking information and experts.

Advantageously, history information derived from past chat sessions is used to rank experts. Also, advantageously, later selection of experts for a given user may be responsive to expert profile and user supplied information, combined with such history information. Further, advantageously new chat sessions may be rated based on quality indications of past sessions informed by text search of those past sessions.

In accordance with one embodiment, a computer method is presented. The method includes performing operations in at least one data processing device. The operations include maintaining a database, receiving a request for a new chat session and deriving information relevant to the new chat session. The database includes historical chat session transcripts along with a respective quality indication for each transcript. The transcripts relate to past user inquiries of experts within a social network. The information relevant to the new chat session is responsive to at least one of the quality indications and similarity between the request and text from chat session transcripts from the database.

In accordance with another embodiment, a system is presented. The system includes at least one medium for embodying machine readable data and machine performable program code; at least one interface for communicating externally; and at least one processor adapted to perform operations responsive to the medium and interface. The operations include those listed above with respect to the method.

In accordance with another embodiment, a medium is presented. The medium embodies machine readable data and machine performable program code. The code is adapted to cause at least one data processing device to perform operations. The operations include those listed above with respect to the method.

Objects, advantages, and further embodiments will be discussed more below.

BRIEF DESCRIPTION OF THE DRAWING

Embodiments will now be described by way of non-limiting example with reference to the drawing, which includes the following figures:

FIG. 1 shows a confusion matrix.

FIG. 4A shows SAP® Enrollment Taxonomy in BluReach™.

FIG. 8A shows a chat session transcript with rating information.

FIG. 8B shows a chat session transcript with rating information.

FIG. 10A-1 lists a formula.

FIG. 10A-2 lists a formula.

FIG. 10B defines a function.

FIG. 10C defines a function for evaluating quality of user sessions with a tunable parameter.

FIG. 10D lists an equation.

FIG. 10E lists an equation.

DETAILED DESCRIPTION OF THE PREFERRED EMBODIMENTS

The word "text," as used herein, may include chat session transcripts, keywords, or contents of bags of words or words in term vectors. The term "quality indication" as used herein includes both user generated and computer generated ratings.

Social Network analysis, particularly with the possibility of analyzing large scale data through the Internet has been discussed in articles such as: R. A. Hanneman and M. Riddle, *Introduction to Social Network Methods*, University of California, Riverside, Riverside, Calif. (2005). Studies relating to expert finding systems can be found in articles such as M. S. Ackerman, V. Wulf and V. Pipek (eds.), *Sharing Expertise: Beyond Knowledge Management*, MIT Press, 2002 and references therein. The use of social network analysis is prominent in systems such as ReferralWeb, H. Kautz, B. Selman and M. Shah, "Referral Web: combining social networks and collaborative filtering," *Commun. ACM*, 40, No. 3, 63-65 (1997). Graph-theoretic techniques have also been evaluated Zhang et al.; and B. Dom et al., "Graph-based ranking algorithms for e-mail expertise analysis," *Proceedings of the 8$^{th}$ ACM SIGMOD Workshop on Research Issues in Data Mining and Knowledge Discovery*, San Diego, Calif., Jun. 13, 2003, pp. 42-48. ("Dom et al."). While Zhang et al. explored graph-based algorithms in the context of expertise ranking in online java forums with emphasis on structural statistics and also on simulations of question-answering dynamics; Dom et al explored a different application & data source: judging expertise based on email exchange graph restricted to a topic. Standard Information Retrieval ("IR") techniques based on keyword match to expert profile have been the typical architecture of expertise finding systems. Analysis of performance of existing systems has been reported in articles such as G. E. Littlepage and A. L. Mueller, "Recognition and utilization of expertise in problem-solving groups: Expert characteristics and behavior," *Group Dynamics Theory, Research, and Practice*, 1. 324-328 (1997).

Corporate Expertise Networks

In order to better identify problems and solutions in the field of social networking suitable for use in large organizations, the inventors herein undertook a study of performance of a state of the art system. This study included prototyping an expertise recommendation engine as an enhancement of an internal IBM Research project called BLUEREACH™, see e.g. K. Singley, J. Lai, L. Kuang, and J. Tang, "Bluereach: harnessing synchronous chat to support expertise sharing in a large organization," *CHI* 2008, Florence, Italy, Apr. 5-10, 2008, pp. 2001-2008. While this example was done using BLUEREACH™, any standardly available chat room technology is suitable.

Figure 4:
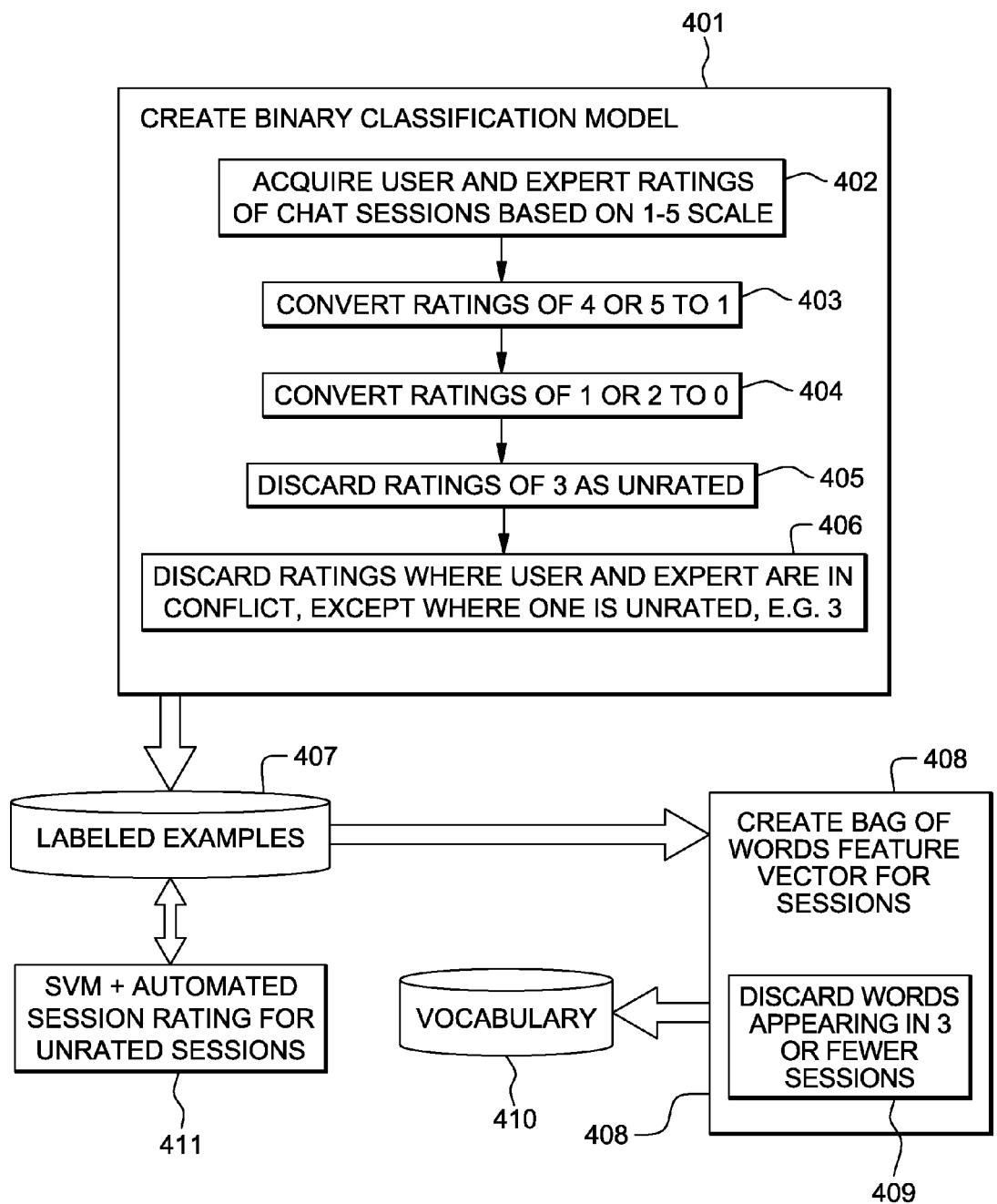
FIG. 4 shows a flowchart relating to a binary classification model.

BLUEREACH™ uses synchronous chat with automatically created, topic-dependent buddy lists, to link up a question-asker with a question answerer who has agreed to be available. Conversations are one-to-one and the question answerers have the ability to control when they are visible to the system. Currently, BLUEREACH™ supports a community of 16,000 consultants across a taxonomy of 15 different top-level subject domains (e.g., testing, particular vendor software packages, e-commerce etc) each with several topic categories. A taxonomy example is shown in FIG. 4a. This figure shows a list of sub-topics under the heading SAPID, which is the name of a company that provides enterprise resource planning software solutions, along with a number of experts listed for each topic.

In a typical usage scenario within the prototype, a user begins by selecting a topic for his/her question from a browsable tree of topics. When a topic is selected, the application displays a list of people who are currently available and have enrolled themselves as experts on this topic. The user then composes a question and selects a name which launches a chat session. The question is immediately presented to the expert.

If the question is not a good match for his/her expertise, both parties can quickly establish this fact. At the end of the chat, both parties can optionally rate their satisfaction with the interaction on a scale of 1 to 5. The complete interaction is recorded in a database on the BLUEREACH™ server.

Empirical Study of BLUEREACH™ Expertise Network

After the above-mentioned prototyping, study focused on 54 topics under a node relevant to vendor software, from the SAP® company of the BLUEREACH™ taxonomy. Some chats recorded in the BLUEREACH™ database that were one-sided sessions and that did not continue beyond the first communication, were excluded prior to evaluation. The remaining data included 1181 chat sessions involving a community of 651 members of which 386 acted as users and 309 acted as experts with 44 experts also taking on the role of a user at some point. Of the 1181 chat sessions, 655 were rated by at least one party (mostly users) and only 166 were rated by both. The confusion matrix of User-Expert Ratings is given in Table 1, FIG. 1. Among the 166 sessions rated by both parties, the agreement in the absolute rating was low, just 28%. On the other hand, when neutral 3-ratings are discarded, ratings 1 and 2 are considered negative, and ratings 4 and 5 are considered positive, the agreement in the binary judgment of the quality of interactions is 73.12%. This motivates treating ratings as a binary variable. Consequently, a binary classification model to predict missing or ambiguous ratings is developed below.

Figure 2:
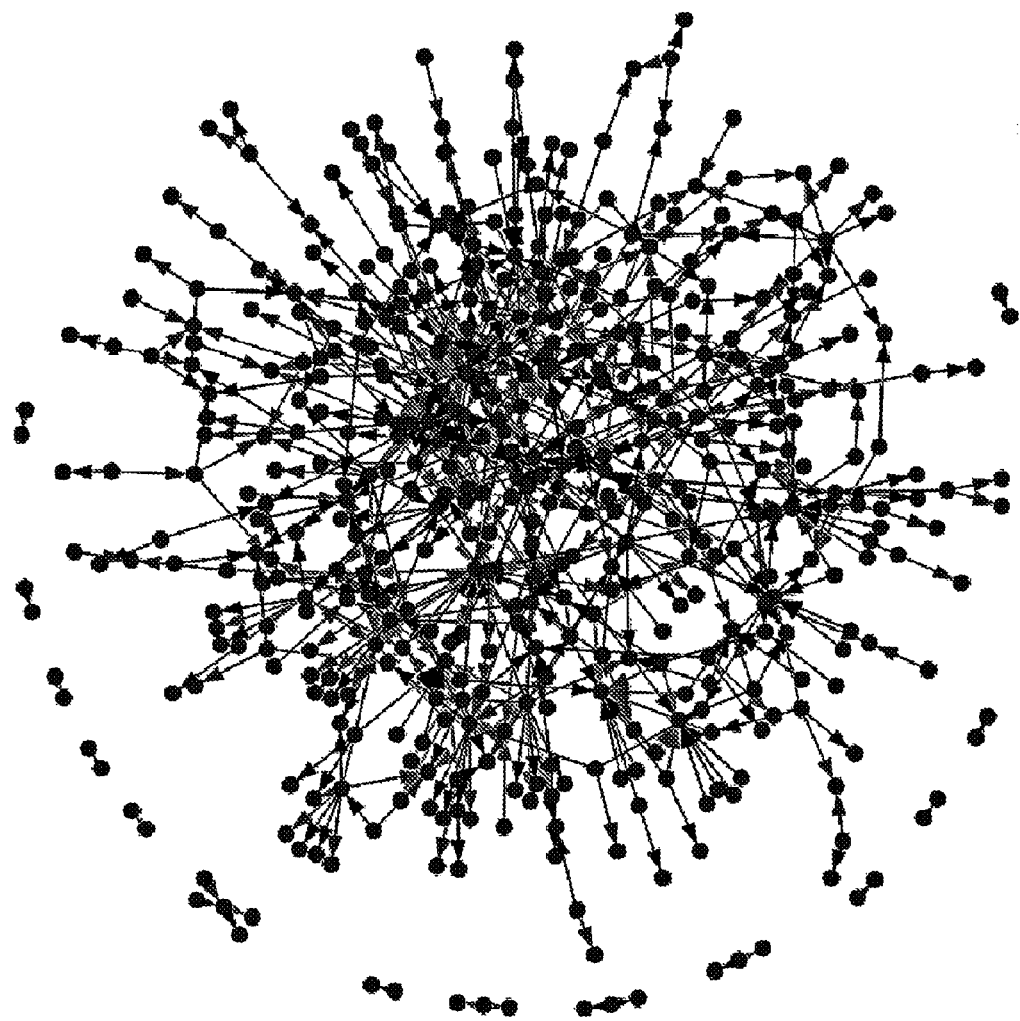
FIG. 2 shows a directed graph of users and experts.
Figure 3:
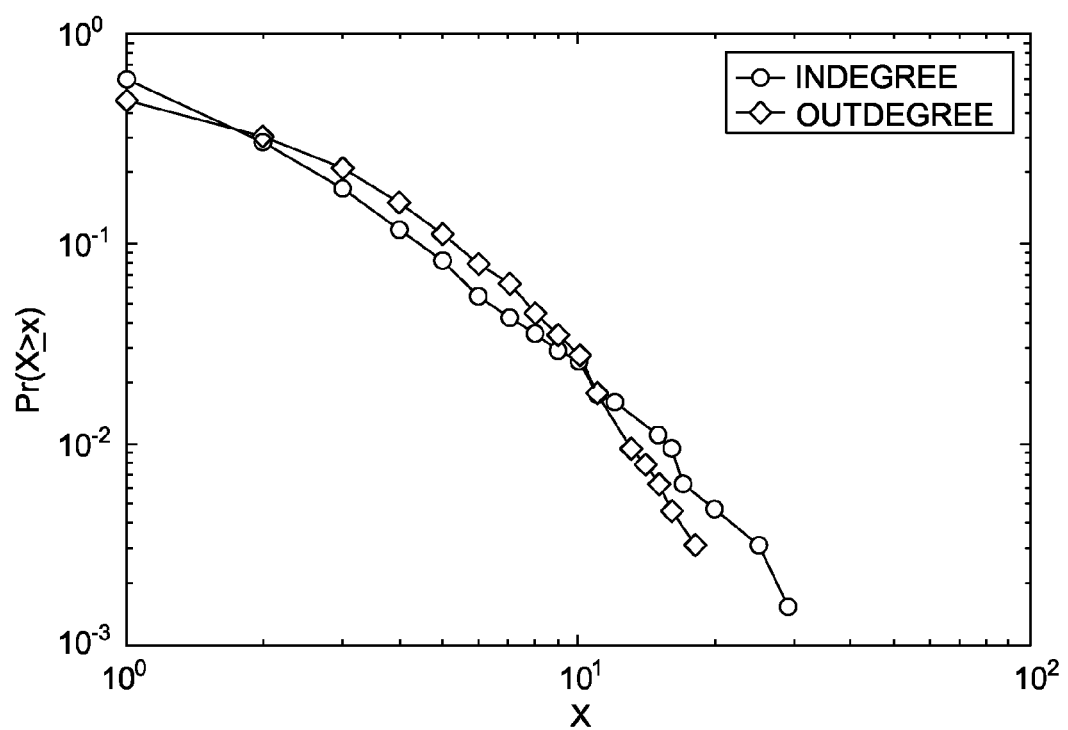
FIG. 3 shows a graph of in and out degrees of nodes in the graph of FIG. 2.

FIG. 2 shows a BLUEREACH™ social interaction graph whose nodes are community members while directed edges go from an expert to a user representing all sessions between them. In/out degrees in this network are shown in FIG. 3. In this figure, the horizontal axis, x, represents real number in log scale, and y axis indicates the probability that the IN/OUT degree, X, is greater than x. One observation is that while the BLUEREACH™ network used in the prototype is sparse—with a mean in/out-degree of 1.54, it is better connected as an undirected graph. The undirected connected component dominating FIG. 2 accounts for more than 93% of the nodes. FIG. 3 shows the in-degree (number of questions asked) and out-degree (number of questions responded) distributions. These distributions are approximated by power laws with exponent 2.59 and 2.84 respectively, for example. Degree distributions are one way to analyze the structure of a large network. Power law distributions indicate networks where the majority of nodes are connected to a few neighbors, but there are just a handful of nodes that connect to a relatively large number of neighbors. Such power law distributions with exponent between 2 and 3 are observed in a range of networks: from the web to protein-protein interactions in biology. The distribution reflects highly non-uniform participation—most experts answered just a single question while a few answered many, including one who answered 18 sessions. Likewise, most users ask a single question and only a few ask many, including one who asked 29 questions.

These observations on the degree distributions are similar to what Zhang et al report for online java forums. However, the above study did not find rich directed structure in the BLUEREACH™ enterprise expertise network, while Zhang et al. report an uneven bow-tie structure for the java forum where a strongly connected core accounts for around 12% nodes. Such structures did not appear in the BLUEREACH™ community study described above. On the other hand, the analysis of the undirected version of the graph suggests some users and experts reach across many topics forming long-range connections between several topic-focused sub-communities resulting in a single undirected component containing a large percentage of nodes.

A rich, directed structure has in the past motivated many graph-based ranking algorithms (see Dom et al.; Zhang et al. and references therein) such as PageRank and HITS—but the absence of such structure, as found above, leads in another direction.

A Prediction Model for Ratings

It was then hypothesized that ratings of sessions would address deficiencies in past expertise networks. In order to test this hypothesis, per FIG. 4, a binary classification dataset was developed to learn a classification model for predicting ratings of unrated or ambiguous sessions. First, a binary classification model was set up 401. Setting up the model included acquiring user and expert ratings of chat sessions on a 1-5 scale at 402. These ratings were converted to 1 if rating was 4 or 5 per 403, and 0 if rating was 1 or 2 per 404. Ratings of 3 were considered unrated. Ambiguous sessions were discarded at 405, i.e., where the binary-valued user-expert ratings conflicted. However, sessions were retained where the label for only one party was available at 406. This retention included cases where the other party either did not provide a rating to begin with, or provided a rating of 3. This led to a dataset containing 509 labeled examples at 407. At 408, a bag-of-words feature vector representation for the text content of session transcripts was created, pruning away words that appeared in 3 or fewer labeled sessions at 409. This resulted in a vocabulary of 2180 words at 410. In this example, no stemming or stop word removal was applied, though one of ordinary skill in the art might implement these as a matter of design choice.

Session ratings may be taken from user feedback, when they are available, but automated rating—done by a binary classifier trained using the available session ratings—may provide ratings for the sessions that do not have user feedback at 411.

For automated rating, a linear Support Vector Machine ("SVM"), per B. Schölkopf and A. J. Smola. *Learning with Kernels*, MIT Press, Cambridge, Mass., 2002, with regularization parameter 0.1 was then trained. Surprisingly, it yielded a binary judgment with 10-fold cross-validation accuracy of 73.88% with a standard deviation of 2.86%. This binary judgment accuracy is close to the expert-user binary judgment agreement rates and significantly better than the baseline majority-class-wins classifier which has an expected error rate of 65.03%.

A linear SVM gives a real-valued weight for each word. By sorting these words in the descending or ascending order of the weights, one can identify words that are most predictive of the positive or negative class, respectively. The SVM was then applied to unrated or ambiguous sessions and real-valued model outputs were converted to probabilistic scores using Platt scaling, per H. T. Lin, C. J. Lin, and R. C. Weng, "A note on Platt's probabilistic outputs for support vector machines," *Machine Learning*, 68, 267-276, 2007. More information may be found in the Wikipedia articles about "Linear Classifier" and "Support Vector Machine."

Certain features were discovered to be strongly predictive of negative sessions. For example, if the session was short, a negative quality indication of the session may be inferred, because in many negative sessions the mismatch between the question and the expertise was quickly established leading to short transcripts and fewer turns. Alternatively, if the sessions were longer a positive quality indication might be inferred. For this purpose, short would be approximately two exchanges of information—or turns. Moreover, looking at the trained weight vector from the SVM, keywords like call, value, lot, sap, middleware, welcome, thanks and so on tended to indicate a positive session. Heuristically, these words might be characterized as relating to either technical subject matter or gratitude. Analogously, looking at the trained weight vector from the SVM, keywords like know, could, sorry, pls, idea, busy, dont and so on tended to indicate negative sessions. Heuristically, these words might be characterized as relating to inquiry, obstacles, or embarrassed politeness.

While the three criteria: session length, positive keywords, and negative keywords were used implicitly by the SVM in an automated fashion, these criteria might also be used explicitly by one of ordinary skill in the art as a matter of design choice in a different implementation of a classification system for rating unrated sessions.

Based on this study, the overall effectiveness of enterprise expertise networks is enhanced by designing a recommendation system to rank experts according to their suitability to answer a given question on a specific topic. Preferably, the history of past interactions and user specific information accessible in enterprise databases is dynamically processed using machine learning and information retrieval techniques, and used to configure a real-time expertise recommendation engine.

Technical Components

Figure 5:
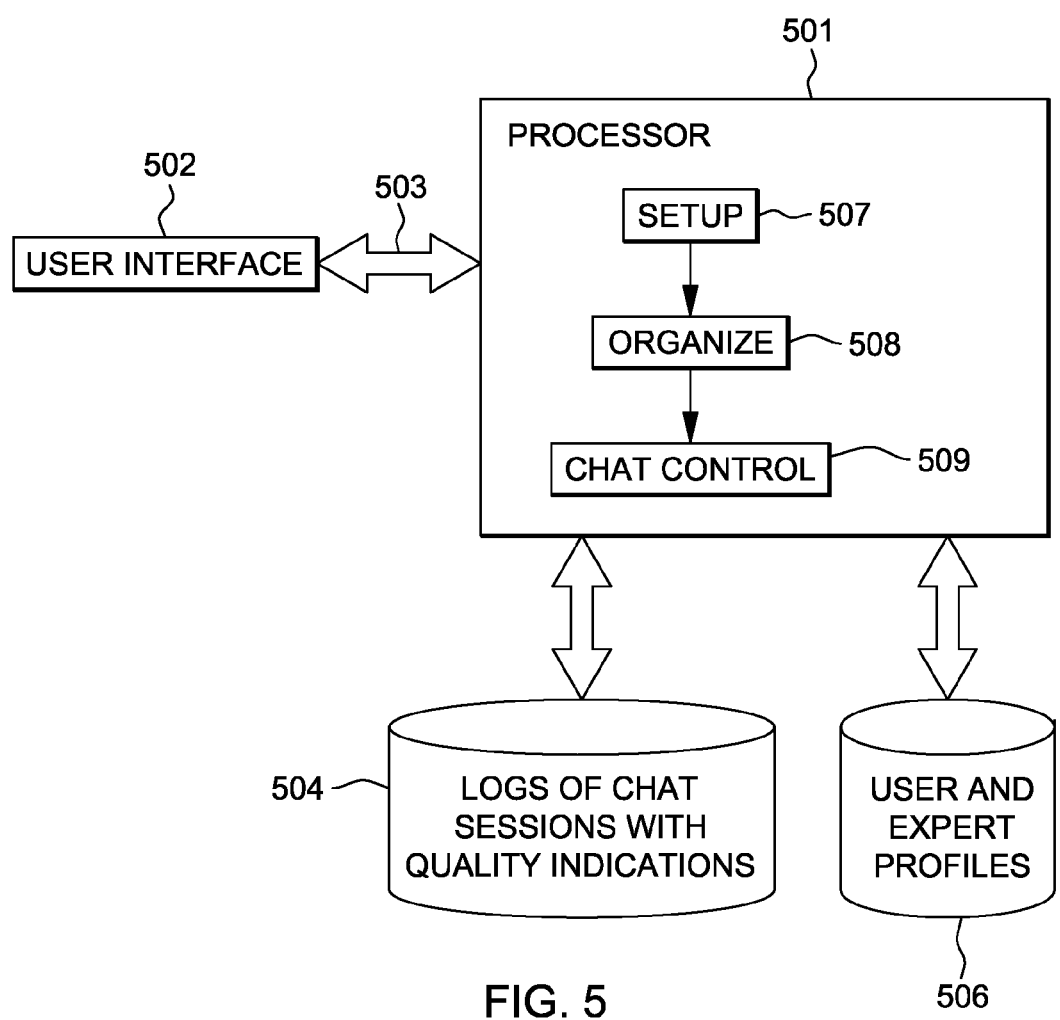
FIG. 5 shows a computer system.

FIG. 5 shows an overview of a system implementing an embodiment. The system includes a processor 501, a user interface 502, a communication device 503, running modules (including setup 507, organize 508, and chat control 509) and databases (504, 506). The embodiment is not limited to any particular processor, interface or storage device. Elements illustrated as singular in the drawing might, in implementation, actually extend over plural devices; while elements illustrated as separate in the drawing might be incorporated in a single device. Modules shown may be implemented as hardware or software. Software may be stored internally to the processor or externally. Databases can be implemented in any suitable format, as a matter of design choice. The databases illustrated here are logs of chat session 504 and user and expert profiles 506.

Given a new or existing user with a new question on a topic, experts enrolled in that topic may be ranked in decreasing order of potential match, taking into account the following: (a) past interactions and ratings if available and (b) internal information about members such as job profiles, description of project engagements etc. A good ranker is one which encourages user-expert interactions that lead to highly rated sessions, thus driving-up the net quality of the network.

Figure 6:
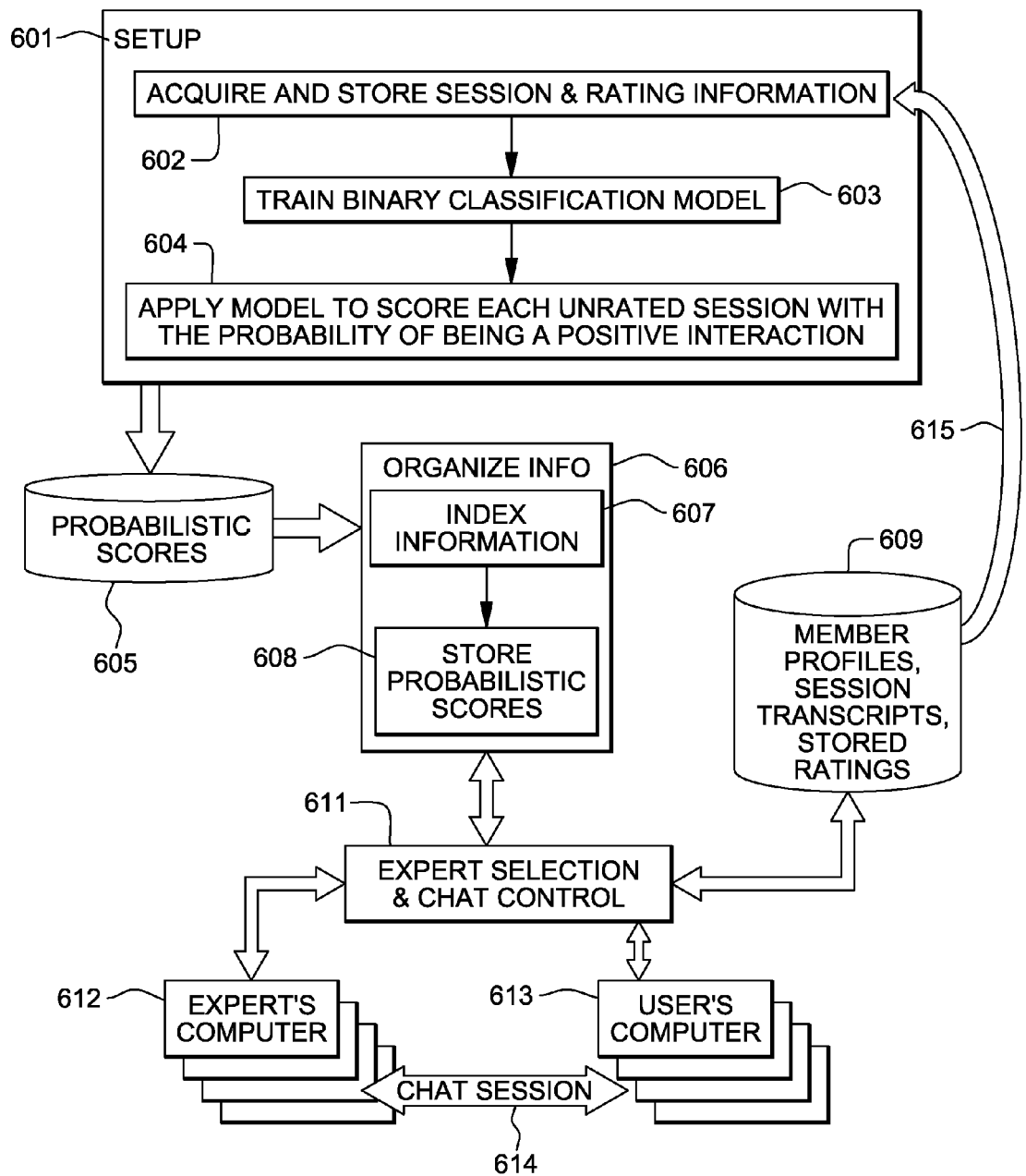
FIG. 6 shows a flowchart of a computer method that includes dynamic update of expert ratings based on chat session.

FIG. 6 shows an embodiment of a recommendation engine that includes three modules 601/507, 606/508 and 611/509 to be configured for real-time use.

Module 601 is designed to ameliorate the problem of sparse expert and user ratings. In this element, sessions labeled with rating information 615 are received and stored at 602. These sessions inform training of a binary classification model at 603, the model producing at 604 probabilistic outputs at 605. These probabilistic outputs would then be quality indications for the chat session transcripts. The same classification model that was used in FIG. 4 for testing can be used here at 603 and 604.

In the second module 606, member profiles and session transcripts are treated as a document collection. Standard information retrieval tools to index this collection at 607 and also store 608 the probabilistic scores produced by the binary classification model for the sessions, with the collection and the probabilistic scores being stored at 609. An index is simply a collection of term vectors. Each term vector indexes a document in terms of the words it contains.

Modules 601 and 606 are run dynamically to keep the recommendation system up-to-date with the latest sessions and ratings data 615 from the database 609.

An expert selection & chat control module 611 receives a new question from a user computer 613. This question is treated as a query to the indexed document collection 609. At query time, similarity scores weighted by positive rating probabilities are assigned to produce the ranking scores for experts at computers 612. Expert selection will be responsive to this ranking, either with or without input from a user 613. When a chat session 614 is initiated, control and recording of the chat session occurs. For simplicity of the drawing, users and experts are shown as separate groups in this figure; but some users may be also be experts and some experts may also be users. All should have member profiles.

While ratings and probabilistic scores are proposed here as quality indications for chat session transcripts, one of ordinary skill in the art might devise other such indications as a matter of design choice.

Indexing Sessions and Profiles

Figure 7:
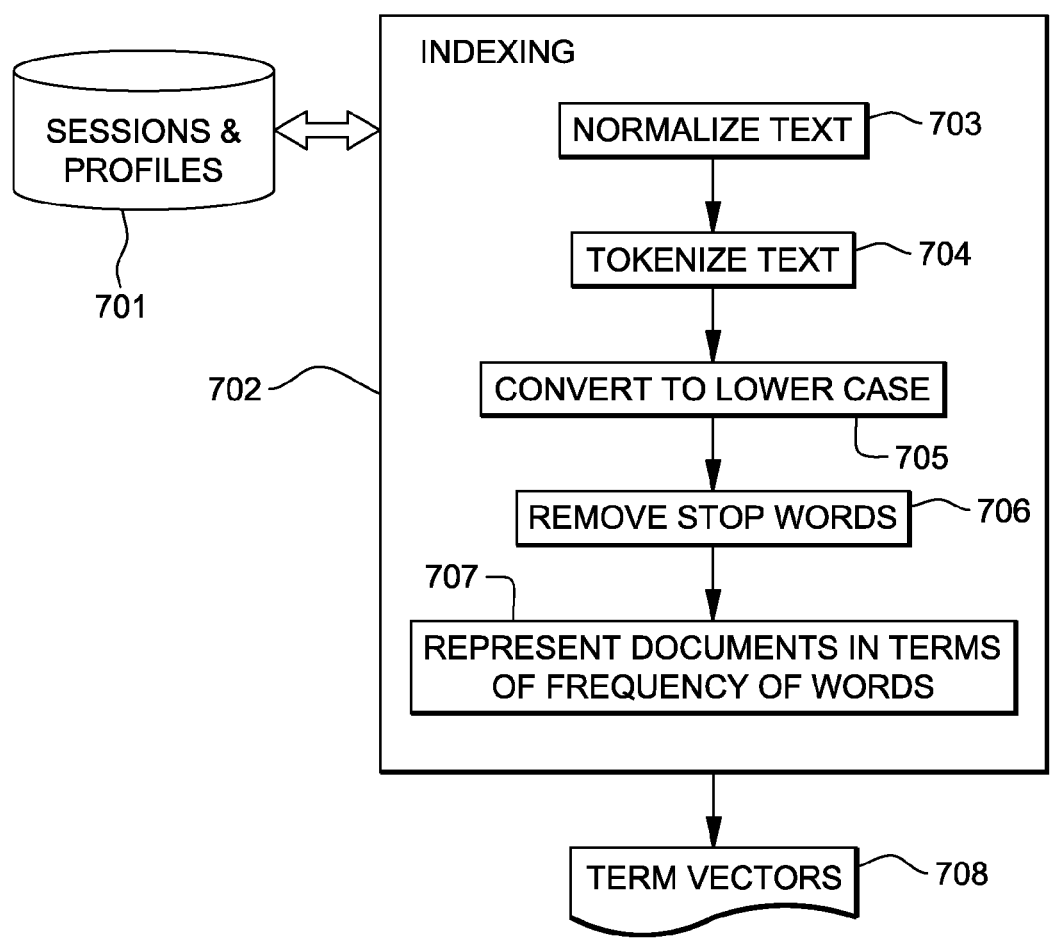
FIG. 7 shows a flowchart with more detail of a computer indexing method.

More about the embodiment of indexing element 607 is to be found in FIG. 7. Member profiles attributes may be in any standard format. One such format is the IBM BLUEPAGES™, which contains textual descriptions of member expertise, interests, past projects and team involvements. Other examples of profiles can be found in Google "Profiles," CVs, web pages, and LinkedIn profiles.

Session transcripts and profiles may be indexed per FIG. 7, using standard software, such as the LUCENE standard analyzer. Indexing, includes normalizing 703 and tokenizing 704 text in a standard manner, converting to lower-case 705, and performing stopword removal 706. Ultimately, the document is represented in terms of frequencies of words at 707 and term vectors are output at 708. A term vector is a list of words/tokens with their associated frequencies. Indexing is the process of converting a document collection into a set of term vectors, each representing a document.

For any member v, the profile was denoted by profile(v). The function sessions(e,u,i) denotes the $i^{th}$ session between the user u and expert e.

A Similarity Aggregation Approach

Figure 8:
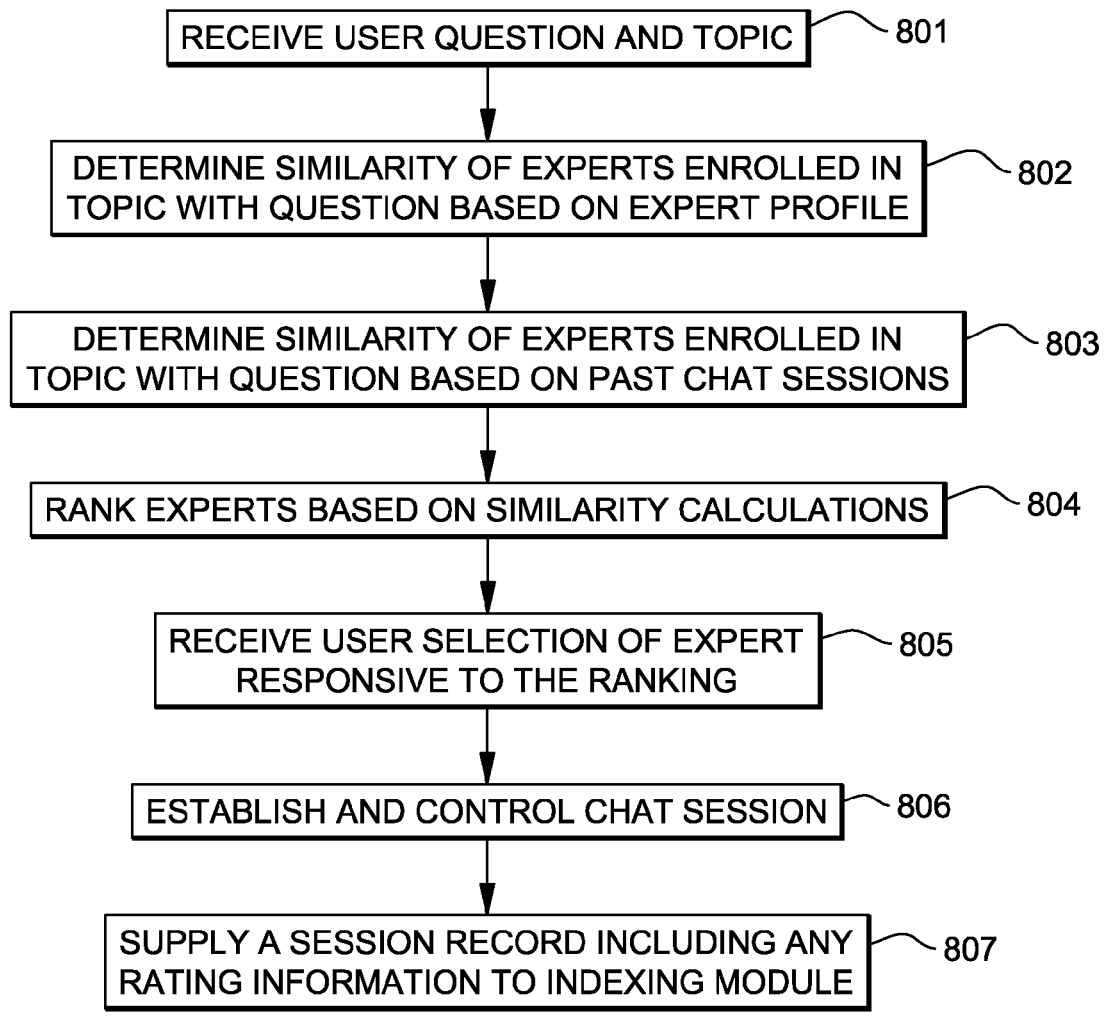
FIG. 8 shows a flowchart with more detail of a runtime module.

More information about the preferred embodiment of element 611 of FIG. 6 appears in FIG. 8. At run time 801, a user u selects a topic t and inputs a question q. Alternatively, q may represent information derived from a combination of question asked and user profile information. In this case, the text would be concatenated and treated as a single query document. The value in q is treated as a text query to the document collection index 609. LUCENE has capability to return:

the score given in FIG. 10A-1, i.e. the similarity between q and the profile of each expert e per 802; and the score given in FIG. 10A-2, i.e. the similarity between q and the session transcript involving each expert e per 803.

Text similarity is defined using standard TF-IDF-based measures, e.g. in LUCENE, the formula of FIG. 10B.

At 804, the ranking score is computed in accordance with the equation of FIG. 10C, where α is a tunable parameter which balances the profile and session transcript similarity. The second term is summed over all sessions involving the expert where p(e,u,i) is the probabilistic score assigned by the ratings model to session(e,u,i). A session with high similarity to the question but low rating provides evidence that the subject at hand is not well matched to the expertise under consideration. Correspondingly, the score is modulated by a weight p(e,u,i)−0.5 which is negative for sessions that were predicted to be negatively rated (<0.5). The total score is normalized by the total number of sessions to make comparisons across experts roughly comparable. An expert is then chosen by a user based on the ranking at 805. A chat session is established at 806. A chat session transcript—along with any ratings given by the user and expert—is returned at 807 to the indexing module 607.

Many experts have sparse BLUEPAGES™ profiles and most have short history of past interactions. While BLUEPAGES™ profiles may be used in one implementation, other profiles may be used. In general, a profile could include things like:

jobs and contact info,
experience and qualifications,
skills,
projects and teams the person is/has been involved in,
communities the person belongs to,
interests, and
for enterprise internal profiles, reporting structure.

Such experts may be tied with a score of 0 when no text match is made. Ties in recommendation scores are randomly broken.

Some sessions along with ratings given by users and experts are given in FIGS. 8A and 8B. Both of these chat sessions had ambiguous ratings and therefore would be considered unrated for purposes of calculations here.

Evaluation

There are several ways to evaluate a recommendation system. Human raters were asked in Zhang et al. to generate a query-independent categorization of a small subset of experts with respect to the level of their Java expertise and this is used as a standard for experimentation. This was done by independent java experts who could evaluate interactions in the online community to judge the expertise levels of different individuals.

The BLUEREACH™ setting lacked topic-dependent query-independent ranking of experts. Also, this network was smaller, sparser and designed to cover a wider range of topics than the one discussed in Zhang et al. Moreover, unlike online forums that deal with specialized, well-defined subjects, the notion of expertise in an enterprise setting can be quite diffuse: from specific technical know how to knowledge about enterprise-specific business practices. It is therefore challenging to create a standard for categorization.

For these reasons, evaluation was based on a subset of rated historical interactions to create a test set and reduce the evaluation task to that of evaluating the accuracy of a binary classifier. Implementation of this evaluation will now be described. A test set composed of 44 sessions was drawn from the data. 20 of these sessions had user ratings of 1 or 2 forming negative examples, and 24 had user ratings of 4 or 5 constituting the positive set. Questions were manually harvested from these sessions and passed one by one to a recommendation scheme. The recommendation scheme was evaluated with respect to the top k experts it returned given a question. If the expert associated with the question was retrieved in the top-k experts, the session was assumed to have been positively labeled by the recommender; otherwise negative. When k is small, fewer experts ranked by score are retrieved, so one is less likely to retrieve an expert associated with negative sessions, i.e. who has lower rank; but on the other hand more likely to miss experts associated with positive sessions. In other words, a small number on top are retrieved; while others that may be still good, but didn't make it to the top k may be missed. When k is large, more experts with positive scores will be retrieved, but with the risk of bringing along some with negative sessions. Thus the quality of a recommendation scheme is captured by plotting its accuracy as a binary classifier with respect to k.

Figure 9:
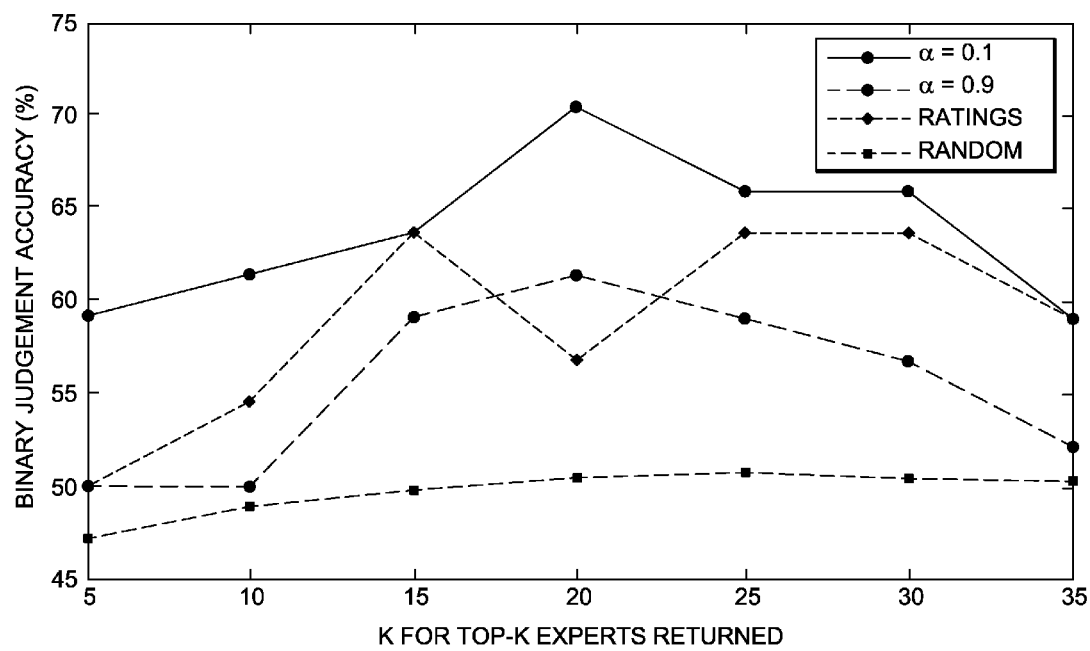
FIG. 9 shows result data relating to testing use of expert ratings in locating experts in a social network.

FIG. 9 shows curves for the following schemes:
- a random ranker, indicated by dotted line and square data points, whose accuracy for top-k experts returned can be computed as indicated in the equation of FIG. 10D. The first term measures the probability for the expert to be retrieved for positive sessions while the second term measures the probability of not being retrieved for negative sessions in a randomly drawn list of k experts for a given topic.
- the ranking given by the mean probabilistic rating over all sessions for an expert, indicated by dotted line with data points, and calculated per the formula of FIG. 10E.
- a ranking scheme, using the equation of FIG. 10C with alpha=0.9, so that text similarity between question asked and the expert profile has greater weight, shown by the dotted line with diamond shaped data points.
- a ranking scheme, using the equation of FIG. 10C with alpha=0.1, so that past interactions data has greater weight, shown by the solid line with circular data points.

Random ranking performed worst. Rankings based primarily on match to expert profiles performed better, but worse than the query-independent scheme of mean probabilistic ratings. Finally, taking all sources into account with emphasis on weighted match to past interactions produced the best results.

From reading the present disclosure, other modifications will be apparent to persons skilled in the art. Such modifications may involve other features which are already known in the design, manufacture and use of finding experts in social networks and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages. Net, Binary code) run by a processor (e.g., Intel® Core™, IBM PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention. The present invention may include a computer program product for performing one or more of functions of this invention. The computer program product comprises a storage medium (e.g., a disk drive, optical disc, solid-state drive, etc.) readable by a processing circuit (e.g., a CPU or processor core) and storing instructions run by the processing circuit for performing the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A computer method comprising performing operations in at least one data processing device, the operations comprising:
   maintaining, embodied in at least one computer readable medium, at least one database including expert profile information and historical chat session transcripts along with a respective quality indication for each transcript, the transcripts relating to past user inquiries of experts within a social network;
   receiving a request for a new chat session including a question from a current user; and
   deriving information relevant to the new chat session responsive to at least one of:
      the quality indications; and
      similarity between the request and text from chat session transcripts from the database, said deriving comprising, not necessarily in the following order:
         comparing the question with text from the chat session transcripts to obtain first results;
         comparing the question with the expert profile information to obtain second results; and,
         combining the first and second results of together with the quality indications to yield a ranking of experts relevant to the question.

2. The method of claim 1, wherein the request for the new chat session also includes a topic indication and the deriving operation comprises using the topic indication in selecting experts to rank.

3. The method of claim 1, wherein combining comprises using a formula that includes a tunable parameter that balances the results of the first and second comparing.

4. The method of claim 3, wherein the formula comprises:

$$\text{Score}(e) = \alpha * sim(\text{profile}(e), q) + (1 - \alpha)\Sigma sim(\text{session}(e, u, i), q) * [p(e, u, i) - 0.5]$$

where:
   e is variable representing an expert;
   q is a variable representing a question;
   profile(e) is a function that retrieves a profile of an expert;
   sim( ) is a function that calculates similarity of text;
   u is a variable representing a past user, who engaged in a chat session;
   i is an index running through the stored sessions; and
   p( ) is a probabilistic score assigned by a ratings model.

5. The method of claim 1, wherein the user and experts are members of a same organization.

6. The method of claim 1, the operations further comprise dynamically updating the database responsive to new chat sessions.

7. The method of claim 1, wherein the operations further comprise:
   implementing a classification protocol with respect to the database, the classification protocol using one or more of session length;
      a first set of keywords from the database, the first set being associated with at least one session that has a positive quality indication; and
      a second set of keywords from the data base, the second set being associated with at least one session that has a negative quality indication; and
   upon completion of the new chat session, creating and storing a new quality indication for the new chat session based on the classification protocol.

8. The method of claim 1, wherein quality indication is responsive to a binary classification model.

9. The method of claim 8, wherein, for at least one chat session, quality indications are obtained from both chat session participants and the session is considered
   positive if both quality indications are positive;
   negative if both quality indications are negative; and
   unrated if one quality indication is positive and the other negative.

10. A system comprising:
    at least one medium for embodying machine readable data and machine performable program code;
    at least one interface for communicating externally;
    at least one processor adapted to perform operations responsive to the medium and interface, the operations comprising
       maintaining, embodied in at least one computer readable medium, at least one database including expert profile information and historical chat session transcripts along with a respective quality indication for each transcript, the transcripts relating to past user inquiries of experts within a social network;
       receiving a request for a new chat session including a question from a current user; and
       deriving information relevant to the new chat session responsive to at least one of:
          the quality indications; and
          similarity between the request and text from chat session transcripts from the database, said deriving comprising, not necessarily in the following order:
          comparing the question with text from the chat session transcripts to obtain first results;
          comparing the question with the expert profile information to obtain second results; and,
          combining the first and second results of together with the quality indications to yield a ranking of experts relevant to the question.

11. The system of claim 10, wherein combining comprises using a formula that includes a tunable parameter that balances results of the first and second comparing.

12. The system of claim 10, wherein the operations further comprise, not necessarily in the following order:
    implementing a classification protocol with respect to the database, the classification protocol using one or more of session length;
       a first set of keywords from the database, the first set being associated with at least one session that has a positive quality indication; and
       a second set of keywords from the data base, the second set being associated with at least one session that has a negative quality indication; and
    upon completion of the new chat session, creating and storing a new quality indication for the new chat session based the classification protocol.

13. The system of claim 12 wherein
    quality indication is responsive to a binary classification model; and
    for at least one chat session, quality indications are obtained from both chat session participants and the session is considered
       positive if both quality indications are positive;

negative if both quality indications are negative; and
unrated if one quality indication is positive and the other negative.

14. A computer program product for performing operations in at least one data processing device, the computer program product comprising:
   a storage medium readable by a processing circuit and storing instructions run by the processing circuit for performing a method comprising:
   maintaining, embodied in at least one computer readable medium, at least one database including expert profile information and historical chat session transcripts along with a respective quality indication for each transcript, the transcripts relating to past user inquiries of experts within a social network;
   receiving a request for a new chat session including a question from a current user; and
   deriving information relevant to the new chat session responsive to at least one of:
      the quality indications; and
      similarity between the request and text from chat session transcripts from the database, said deriving comprising, not necessarily in the following order:
      comparing the question with text from the chat session transcripts to obtain first results;
      comparing the question with the expert profile information to obtain second results; and,
      combining the first and second results of together with the quality indications to yield a ranking of experts relevant to the question.

15. The product of claim 14, wherein combining comprises using a formula that includes a tunable parameter that balances the first and second similarities.

16. The product of claim 14, wherein the method further comprises, not necessarily in the following order:
   implementing a classification protocol with respect to the database, the classification protocol using one or more of session length;
      a first set of keywords from the database, the first set being associated with at least one session that has a positive quality indication; and
      a second set of keywords from the data base, the second set being associated with at least one session that has a negative quality indication; and
   upon completion of the new chat session, creating and storing a new quality indication for the new chat session based the classification protocol.

17. The product of claim 14 wherein
   quality indication is responsive to a binary classification model;
   for at least one chat session, quality indications are obtained from both chat session participants and the session is considered positive if both quality indications are positive;
   negative if both quality indications are negative; and
   unrated if one quality indications is positive and the other negative.

* * * * *